No. 800,371. PATENTED SEPT. 26, 1905.
E. HARTER.
FRUIT PICKER'S SACK.
APPLICATION FILED APR. 22, 1905.
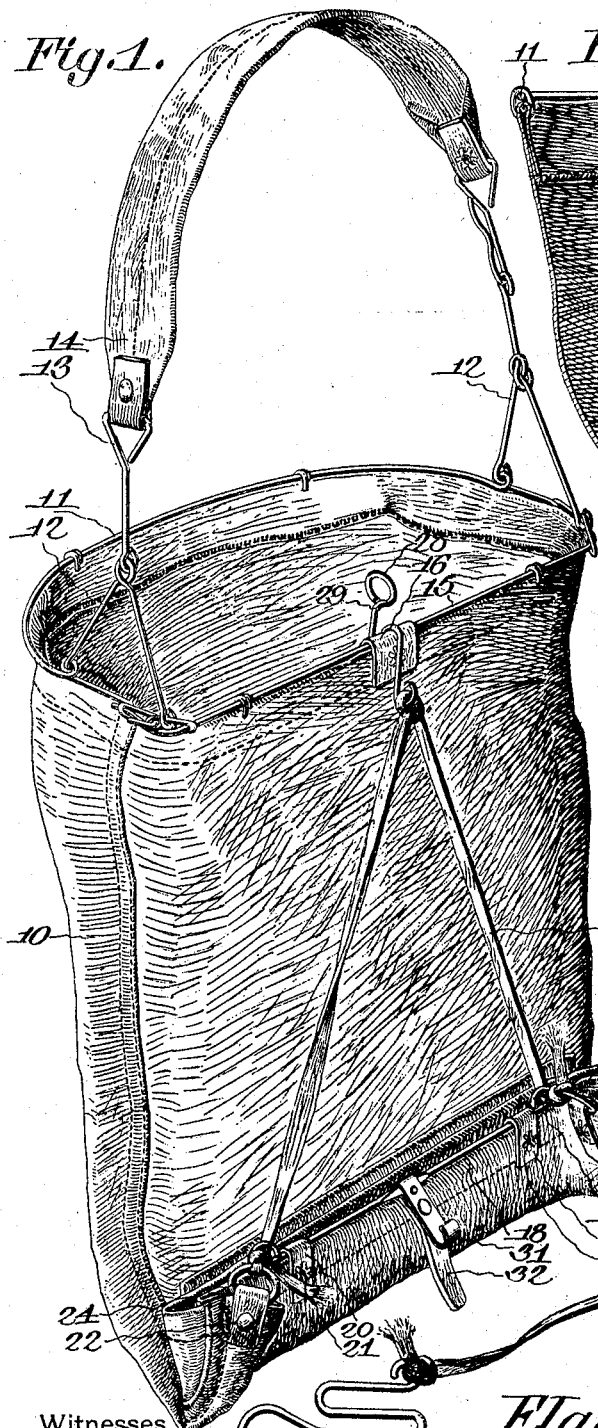
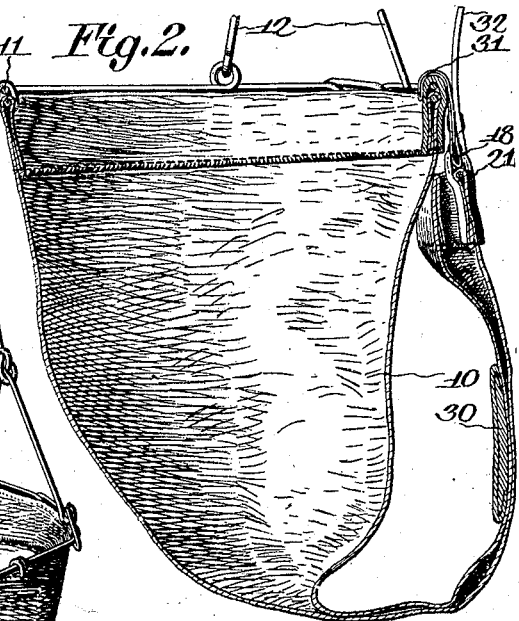
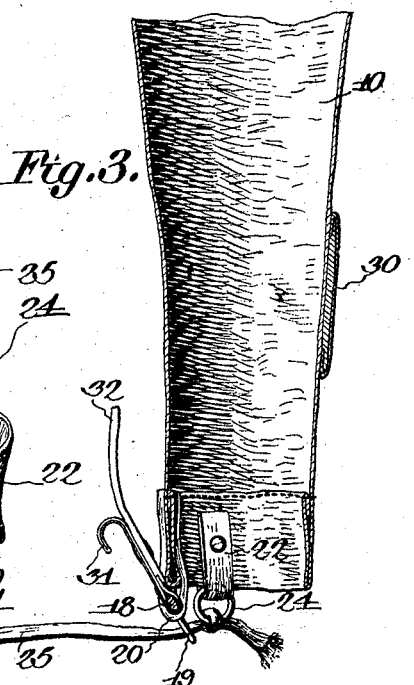
Witnesses
Elam Harter, Inventor.
by C. A. Snow & Co.
Attorneys

UNITED STATES PATENT OFFICE

ELAM HARTER, OF RIVERSIDE, CALIFORNIA.

FRUIT-PICKER'S SACK.

No. 800,371.  Specification of Letters Patent.  Patented Sept. 26, 1905.

Application filed April 22, 1905. Serial No. 256,947.

*To all whom it may concern:*

Be it known that I, ELAM HARTER, a citizen of the United States, residing at Riverside, in the county of Riverside and State of California, have invented a new and useful Fruit-Picker's Sack, of which the following is a specification.

This invention relates to fruit-pickers' sacks, and has for its principal object to provide a sack of simple construction in which the fruit may be placed and from which it may be emptied without danger of damage, a further object being to provide a novel form of sack in which the capacity may be adjusted as the picking progresses, so that the fruit as picked may be laid gently in the sack and bruises and other injury from falling of the fruit prevented.

A still further object of the invention is to provide a sack open at the top for the reception of the fruit and provided with an open bottom through which the fruit may be delivered, the sack being of such construction that by making a simple transverse fold a temporary bottom will be formed and the fruit securely held during the picking operation.

With these and other objects in view, as will more fully hereinafter appear, the invention consists in certain novel features of construction and arrangement of parts hereinafter fully described, illustrated in the accompanying drawings, and particularly pointed out in the appended claims.

In the accompanying drawings, Figure 1 is a perspective view of a fruit-picker's sack constructed in accordance with the invention. Fig. 2 is a vertical section of the same, showing the sack adjusted to its smallest capacity. Fig. 3 is a similar view of the lower portion of the sack, showing the delivery end open.

Similar numerals of reference are employed to indicate corresponding parts throughout the several figures of the drawings.

The sack proper is formed of canvas or other textile material, as indicated at 10, and its mouth is held open by a stiff rim 11, preferably formed of wire. To the mouthpiece are secured bails 12, which may be attached by hooks or links 13 to a shoulder-strap 14 of any desired construction. One side of the guard or mouthpiece is in the form of a straight or slightly-curved bar 15, that is provided at a central point with a suitable protecting strip or pad 16, which may be formed of leather or other suitable material, the pad being held in position by an eyelet or other securing means passing through the body of the sack.

Secured to the bottom of the sack on that side opposite the bar 15 is a metallic bar 18, that is provided at intermediate points with eyes 19, and said bar is held in proper position with respect to the width of the sack by straps 20, encircling the bar at points adjacent to the eyes and held in place by suitable rivets or eyelets 21.

Secured to that side of the sack which carries the bar 18, this side being termed the "outer" side for convenience, are straps 22, formed of leather or other suitable material and serving as supports for rings or eyes 24, to which are secured the opposite ends of a loop or strap 25, formed of tape, cord, or other suitable material, the tape being first threaded through the eyes 20 and then secured to the rings 24, so that if stress is exerted on the central portion of the tape the ends of the bag, or rather the side edges, when the bag or sack is folded, will be drawn around and folded partly over the outer face of the sack.

To the central portion of the tape or cord 25 is secured a hook 28, having a loop portion adapted to embrace the pad 16 and bar 15 and provided with an upstanding eye or handle portion 29 for convenience in manipulation, so that the operator may readily remove the hook from position when the sack is to be emptied.

Secured to the inner face of the sack, being that face to which the bar 15 is attached, is a reinforcing or stiffening band 30, that may be formed of heavy textile or other material, this band extending practically for the full width of the sack when closed and arranged in such position that when the bottom of the sack is folded over, as shown in Fig. 1, it will lie parallel with the folded part and will be sufficiently stiff to prevent the escape of any fruit placed in the sack. If this stiffening portion were omitted and the bottom of the sack merely folded over, there would be danger of the fruit falling out by its own weight, and this is further prevented by the folding over of the end members through their attachments to the tape 25, as previously described.

Pivotally secured to the lower bar 18 is a hook 31, preferably formed of metal and provided with a flexible operating-tab 32, and said hook may be drawn upward to a position to hook over the pad 16 or bar 15 in order to reduce the capacity of the sack to the smallest possible extent when the picking operation is started, so that if the fruit is dropped into the sack it will have but a short distance to fall and there will be little danger of loss through bruising. As the fruit accumulates in the sack the hook 31 is raised from engagement with the outer bar and allowed to fall gradually, while the hook 28 still retains its place, and the fruit is thus lowered gradually to the bottom of the sack, the latter being then of greater capacity and serving to receive a larger quantity of fruit.

When the sack is to be emptied, the operator stands over the box or other receptacle into which the fruit is to be delivered and catching the eye or handle 29 of the hook raises the latter from engagement with the pad 16 and gradually lowers the folded bottom of the sack and allows the fruit to gradually flow from the sack, still retaining, however, his hold on the hook, so that the fruit will not be bruised or otherwise damaged.

Having thus described the invention, what is claimed is—

1. A foldable sack having a reinforced mouth, and a freely-flexible open bottom, the bottom portion being foldable into parallel relation with one side of the sack, the outer face of said sack having a strip of relatively stiff material disposed wholly above the bottom of the sack at a point adjacent to the fold-line of said sack to prevent accidental discharge of the contents thereof.

2. A sack open at top and bottom and foldable at the lower portion to form a bottom, and means for folding the lower corners or edges of the sack inward to prevent the escape of the contents of the sack.

3. A sack open at top and bottom, one edge of the bottom having a stiffening-bar, eyes on said stiffening-bar, a tape or cord extending through said eyes and connected to the lower corners of the sack, and a suspension means for the tape or cord.

4. A sack open at top and bottom, a cross-bar at the top, and a cross-bar extending along one edge of the bottom, eyes carried by the lower cross-bar, rings secured to the corners of the sack-bottom, a tape threaded through the eyes and connected to said rings, and a hook secured to an intermediate portion of the tape and adapted to engage the upper cross-bar at the top of the sack.

5. A sack having a wired top and open at its bottom, a stiffening-bar at one edge of the bottom, eyes carried by the stiffening-bar, rings secured to the sides or corners of the bottom of the sack, a tape extending through said eyes and secured to the rings, a hook connected to the tape and adapted to pass over the wired mouth of the sack, and an auxiliary hook connected to the stiffening-bar and also arranged to pass over the wired top of the sack.

In testimony that I claim the foregoing as my own I have hereto affixed my signature in the presence of two witnesses.

ELAM HARTER.

Witnesses:
STANLEY J. CASTLEMAN,
THEO. D. HURD.